UNITED STATES PATENT OFFICE.

JACOB J. NICHOLS AND BENJAMIN BENAS, OF BROOKLYN, N. Y.

DECORATING GLASS GLOBES, SHADES, AND OTHER ARTICLES.

SPECIFICATION forming part of Letters Patent No. 267,984, dated November 21, 1882.

Application filed August 23, 1882. (Specimens.)

*To all whom it may concern:*

Be it known that we, JACOB J. NICHOLS and BENJAMIN BENAS, of Brooklyn, in Kings county, and the State of New York, have invented a certain new and useful Improvement in Decorating Glass Globes, Shades, and other Articles of Glass, of which the following is a specification.

The object of our invention is to decorate in colors glass globes, shades, and other articles.

To this end our improvement consists in etching or engraving a design upon the articles so as to produce transparent portions, and then painting the transparent portions with a transparent color mixed with a transparent varnish. Preferably aniline colors will be used, and it will be advantageous to apply water-glass to the portions of the articles which are painted.

In carrying out our invention we preferably employ soft glass, which has a large amount of lead in its composition, as that can be frosted or roughened and etched or engraved more delicately than harder glass. We prefer to commence by frosting or roughening the surface to be decorated. This may be performed with acids or in any other suitable manner. Next, we etch or engrave, with acids or otherwise, the design to be delineated upon the article, leaving the same or portions thereof clear, or, in other words, transparent. We now apply to the clear or transparent portions a transparent paint mixed with a transparent varnish. Preferably we employ aniline colors dissolved in alcohol mixed with a transparent varnish—such, for instance, as dammar varnish, white copal varnish, or white shellac varnish. After this paint is set we prefer to apply to it a coating of soluble glass, or as it is otherwise termed, "silicate of soda." Beautiful effects may be produced in this way. The colored portions of the articles will be transparent, brilliant by daylight, and equally brilliant when artificial light shines through them. Much more effective decoration can be produced in this manner than with colors burned into the glass in the ordinary manner, owing not only to the greater transparency of the colors employed, but also to the fact that we can employ softer glass capable of being more delicately etched or engraved than it is possible to employ when the colors have to be burned into the glass.

This method of decorating glass is very cheap and can be quickly performed.

What we claim as our invention, and desire to secure by Letters Patent, is—

1. The method of decorating glass globes, shades, and other articles, consisting in etching or engraving a design upon the articles so as to produce clear or transparent portions, and then applying to the clear or transparent portions transparent colors mixed with a transparent varnish, substantially as specified.

2. The method of decorating glass globes, shades, and other articles, consisting in etching or engraving a design upon the articles so as to produce clear or transparent portions, then applying to the clear or transparent portions transparent colors mixed with a transparent varnish, and then coating the same with soluble glass, substantially as specified.

3. An article of glassware having delineated upon it a design comprising clear or transparent portions, to which are applied transparent colors mixed with a transparent varnish, substantially as specified.

4. An article of glassware having delineated upon it a design comprising clear or transparent portions, to which are applied transparent colors mixed with a transparent varnish and coated over with soluble glass, substantially as specified.

J. J. NICHOLS.
BENJAMIN BENAS.

Witnesses:
FREDK. HAYNES,
T. J. KEANE.